United States Patent [19]

Ligtenberg et al.

[11] Patent Number: 4,760,543
[45] Date of Patent: Jul. 26, 1988

[54] ORTHOGONAL TRANSFORM PROCESSOR

[75] Inventors: Adrianus Ligtenberg, Rumson; Jay H. O'Neill, Freehold, both of N.J.

[73] Assignee: American Telephone and Telegraph Company, AT&T Bell Laboratories, Murray Hill, N.J.

[21] Appl. No.: 928,894

[22] Filed: Nov. 10, 1986

[51] Int. Cl.⁴ .......................................... G06F 15/332
[52] U.S. Cl. ................................................... 364/725
[58] Field of Search ................ 364/725, 726, 727, 754

[56] References Cited

U.S. PATENT DOCUMENTS

| | | | |
|---|---|---|---|
| 3,988,605 | 10/1976 | Guillou | 364/725 |
| 4,293,920 | 10/1981 | Merola | 364/725 |
| 4,385,363 | 5/1983 | Widergren et al. | 364/725 |
| 4,510,578 | 4/1985 | Miyaguchi et al. | 364/725 |
| 4,528,641 | 7/1985 | Burrows | 364/757 |
| 4,612,626 | 9/1986 | Marchant | 364/726 |
| 4,679,163 | 7/1987 | Arnould et al. | 364/725 |

OTHER PUBLICATIONS

"A Discrete Fourier-Cosine Transform Chip", IEEE Journal on Selected Areas in Communications, vol. SAC-4, No. 1, 1986, pp. 49–61, by M. Vetterli et al.

*Primary Examiner*—David H. Malzahn
*Attorney, Agent, or Firm*—Henry T. Brendzel

[57] ABSTRACT

An orthogonal transform processor comprising a rotator circuit, a look-up table and a communicator circuit. The rotator circuit performs the complex multiplications required of a rotator, the necessary coefficients are supplied by the look-up table, and the communicator circuit is charged with the task of accepting input signals, supplying the rotator with the signals necessary for each iteration, and delivering the resultant output signals. The rotator is realized with a matrix of spatially adjacent interconnected multiplier and adder modules, where each module comprises a portion of each of the multipliers necessary in the rotator.

15 Claims, 7 Drawing Sheets

ORTHOGONAL TRANSFORM PROCESSOR

BACKGROUND OF THE INVENTION

This invention relates to signal processors, and more specifically, to high speed integrated circuit signal processors.

In the past, special purpose computers have been used extensively in computationally intensive algorithms when effective solutions to real-time signal processing problems were required. As general purpose computer costs came down and speeds increased, the need for specially designed computers declined; but, of course, there are always bigger problems to be tackled. Custom integrated circuit processors, employed as peripheral co-processors, can serve the same needs. When designed and used properly, they dramatically increase the performance of general purpose computer systems for a large range of computationally intensive programs.

Examples of custom real-time signal processing chips include various embodiments for performing the direct and inverse Discrete Cosine Transform (DCT) with applications in image coding. Such a chip is described, for example, by M. Vetterli and A. Ligtenberg in "A Discrete Fourier-Cosine Transform Chip", IEEE Journal on Selected Areas in Communications, Vol. SAC-4, No. 1, January 1986, pp. 49–61, and in a copending application of S. Knauer, filed on June 19, 1986 and bearing the Ser. No. 876,076.

The DTC, which is an orthogonal transform, is useful in image coding because images contain a fair amount of redundancy and, therefore, it makes sense to process images in blocks. A two dimensional DCT transform of such blocks normally yields mostly low frequency components, and ignoring the high frequency (low magnitude) components does little damage to the quality of the encoded image. Although there is a potential transmission and storage benefit from employing DCT to image encoding the computational burden is quite heavy. To work at video sampling rates requires a processing speed of about 6.4 million samples per second (assuming 15734 scan-lines per second and about 400 samples per line as necessary for NTSC). An eight-point DCT requires at least 13 multiplications and 29 additions. A two dimensional transform can be calculated by applying a one dimensional transform on the rows followed by a one dimensional transform on the columns. Consequently, for real-time image processing a DCT integrated circuit is required to perform 1.6 million eight-point transforms per second involving about 20 million multiplications and 47 million additions.

Another application for custom real-time orthogonal transform signal processor exists in systems that solve least-square problems. Such problems are pervasive in signal processing and linear programming. For example, the most intensive computational aspect of a linear programming problem using Karmarkar's algorithm is actually the solution of a least-squares problem at each iteration. This could be solved with a co-processor consisting of an array of orthogonal transform processors (each consisting of four multipliers, one adder and one subtractor), and the use of such a co-processor would diminish the running time of Karmarkar's software embodiments by an order of magnitude.

To achieve the high performance required in many applications, as illustrated above in connection with DCT image coding, one has to answer two questions. First, what are the basic building blocks involved in these operations, and, second, what are efficient VLSI structures for these building blocks. The answers to these two questions are strongly related, because without a good division of the algorithm one cannot obtain an efficient VLSI implementation, and without knowing how an efficient VLSI structure can be implemented, one cannot obtain optimal partitioning of the algorithm.

These difficulties are illustrated in U.S. Pat. No. 4,510,578 issued to Miyaguchi et al on Apr. 9, 1986, where a circuit is described for subjecting an input signal to an orthogonal transform. The circuit comprises a first stage of three memories operating in parallel and feeding eight constant coefficient multipliers. The output signals of the multipliers are applied to three adders, two of which are three input adders. The three outputs of the first stage are applied to three secondary complex multiplier stages, and each of the three complex multiplier stages comprises two memories, four multipliers and two adders. No effort is made in the Miyaguchi et al circuit to employ an architecture that is particularly fast but, rather, the accent seems to be on employing conventional modules (adders, multipliers) in a combination that achieves the desired transform in the most straightforward fashion.

In contrast, the considerations that must be borne in mind for a good integrated circuit realization relate not only to the number of multipliers and adders required but also to the size of those elements and the delays contributed by them. For example, in some embodiments adding and then multiplying increases the delay much more than multiplying and then adding.

It is an object of this invention to provide an orthogonal transform processor circuit that is particularly well adapted for integrated circuit realizations. It is another object of this invention to provide an orthogonal transform processor whose architecture permits maximum utilization of the speed capabilities of integrated circuits.

SUMMARY OF THE INVENTION

These and other objects are realized with an orthogonal transform processor comprising a rotator circuit, a communicator circuit and an internal or an external look-up table. The rotator circuit performs the complex multiplications required of a rotator, the necessary coefficients are supplied by the look-up table, and the communicator circuit is charged with the task of accepting input signals, supplying the rotator with the signals necessary for each iteration, and delivering the resultant output signals. The rotator is realized with a matrix of spatially adjacent interconnected multiplier and adder modules, where each module comprises a portion of each of the multipliers (or adders, as the case may be) necessary in the rotator. The look-up table is a counterless read-only-memory, and the communictor circuit is a dual-input/dual-output interconnected set of registers.

DETAILED DESCRIPTION

Figure 1:
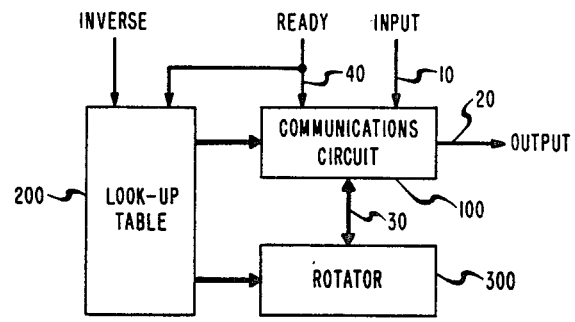
FIG. 1 presents a generalized block diagram of an orthogonal transform processor in accordance with the principles of our invention.

FIG. 1 depicts the general block diagram of our orthogonal transform processor. Therein, input signals are applied on lead 10 to communications circuit 100 and output signals are delivered on lead 20 by communications circuit 100. Circuit 100 is responsive to a "ready" control signal of lead 40 and to control signals, provided by look-up table 200. Communication circuit 100 interacts with rotator 300 via leads 30 which carry signals to and from rotator 300. Look-up table 200 is responsive to the same "ready" control signal and, optionally, to an "inverse" control signal. In addition to providing control signals to communication circuit 100, look-up table 200 also provides coefficient signals to rotator 300. The function and operation of each of the elements within FIG. 1 are described in more detail below.

THE ROTATOR

The least common denominator of orthogonal transform computational primitives is a complex multiplication (or rotation). The equations describing the rotator are:

$$\begin{bmatrix} y_0 \\ y_1 \end{bmatrix} = \begin{bmatrix} c_1 & c_2 \\ -c_2 & c_1 \end{bmatrix} \begin{bmatrix} x_0 \\ x_1 \end{bmatrix} \quad (1)$$

where $x_i$ and $y_i$ are the inputs and outputs respectively, and $c_1$ and $c_2$ are the coefficients, such as $\cos\theta$ and $\sin\theta$, respectively. Direct realization of Equation (1) requires four multiplications and two additions. By manipulating Equation (1) one can obtain the expression:

$$\begin{bmatrix} y_0 \\ y_1 \end{bmatrix} = \begin{bmatrix} A & O & B \\ O & C & -B \end{bmatrix} \begin{bmatrix} x_0 \\ x_1 \\ x_0 + x_1 \end{bmatrix} \quad (2)$$

where $A = c_1 - c_2$, $B = c_2$, and $C = c_1 + c_2$. This version requires three multiplications and three additions and, at first blush, it appears to offer a more compact realization. However, when a careful comparison is made of the VLSI suitability of the two schemes using parallel multipliers it can be seen that, on balance, equation (1) results in a preferred realization. First, the total time delay for the equation (2) realization is longer than that for the equation (1) realization, because of the addition that precedes the multiplication $(x_1 + x_2)$. Second, only two coefficients are needed for the equation (1) realization, as compared to three coefficients for the equation (2) realization, and third, the equation (1) realization consumes less silicon "real estate," because is is amenable to a more regular communication structure between the various elements making up the rotator.

Our realization of the equation (1) rotator relationships in rotator circuit 300 follows a multiplication algorithm similar to one proposed by Baugh-Wooley, which employs reordering and merging of different terms in the multiplication process as expressed below.

It is well known that a negative number having $n-1$ magnitude bits, expressed in 2's complement form, can be expressed as the difference $$x = \left(2^{N-1}x_{N-1}1 - \sum_{i=0}^{N-2} 2^i x_i\right) \quad (3)$$

With such a representation, a multiplication product can be specified by $$xc = \left(2^{(N-1)}x_{N-1} - \sum_{i=0}^{N-2} 2^i x_i\right)\left(2^{N-1}c_{N-1} - \sum_{j=0}^{N-2} 2^j c_j\right) \quad (4)$$

which expands to $$xc = \sum_{i=0}^{N-2}\sum_{j=0}^{N-2} x_i c_j 2^{i+j} + 2^{2N-2}x_{N-1}c_{N-1} - \quad (5)$$

$$2^{N-1}x_{N-1}\sum_{j=0}^{N-2} 2^j c_j - 2^{N-1}c_{N-1}\sum_{i=0}^{N-2} 2^i x_i.$$

The array below shows the partial product terms called for by the terms making up equation (5) (for $N=3$). The first three rows correspond to the first term, the fourth row corresponds to the second term, the fifth and seventh rows correspond to the third term expressed in 2's complement form, and the sixth and eighth rows correspond to the last term of equation (5).

|   |   |   | $c_3$ | $c_2$ | $c_1$ | $c_0$ |   |   |
|---|---|---|---|---|---|---|---|---|
|   |   |   | $x_3$ | $x_2$ | $x_1$ | $x_0$ |   |   |
|   |   |   |   | $x_0c_2$ | $x_0c_1$ | $x_0c_0$ |   |   |
|   |   |   | $x_1c_2$ | $x_1c_1$ | $x_1c_0$ | 0 |   |   |
|   |   | $x_2c_2$ | $x_2c_1$ | $x_2c_0$ | 0 | 0 |   |   |
| 0 | $x_3c_3$ | 0 | 0 | 0 | 0 | 0 |   |   |
| 1 | 1 | $x_3c_2$ | $x_3c_1$ | $x_3c_0$ | 1 | 1 | 1 |   |
| 1 | 1 | $x_2c_3$ | $x_1c_3$ | $x_0c_3$ | 1 | 1 | 1 |   |
| 0 | 0 | 0 | 0 | 0 | 0 | 0 | 1 |   |
| 0 | 0 | 0 | 0 | 0 | 0 | 0 | 1 |   |

A reorganization of the above yields the array of partial product terms depicted below.

```
            ___
           x0c3   x0c2   x0c1   x0c0
           ___
           x1c3   x1c2   x1c1   x1c0
      ___
      x2c3   x2c2   x2c1   x2c0
 ___
1 x3c3   x3c2   x3c1   x3c0
1
```

```
   x0c3   x0c2   x0c1   x0c0
   x1c3   x1c2   x1c1   x1c0
   x2c3   x2c2   x2c1   x2c0
   x3c3   x3c2   x3c1   x3c0
```

From the above it can be observed that the desired product can be obtained with summations of two bit product terms only, with the basic cells needed being AND gates and NAND gates in combination with full-adders and half-adders; some with a carry-in set to "1", and most with a carry-in set to "0". More specifically, in perusing through the second multiplication array expressed above, one can see that the first row requires only three AND gates ($x_0c_0$, $x_0c_1$, $x_0c_2$) and one NAND gate ($\overline{x_0c_3}$). The second row requires three AND gates and half adders having a "0" carry-in ($x_1c_0$, $x_1c_1$, $x_1c_2$) and one NAND gate and a half adder having a "1" carry-in ($\overline{x_1c_3}$). The next row requires three AND gates and full adders ($x_2c_0$, $x_2c_1$, $x_2c_2$) and one NAND gate and a full adder ($\overline{x_2c_3}$). The last row requires three NAND gates and full adders ($\overline{x_3c_0}$, $\overline{x_3c_1}$, $\overline{x_3c_2}$) and one AND gate and a full adder ($x_3c_3$). This pattern of gates and adders can easily be extended in a regular fashion to instances where the multiplier and the multiplicand have more than four bits.

Figure 2:
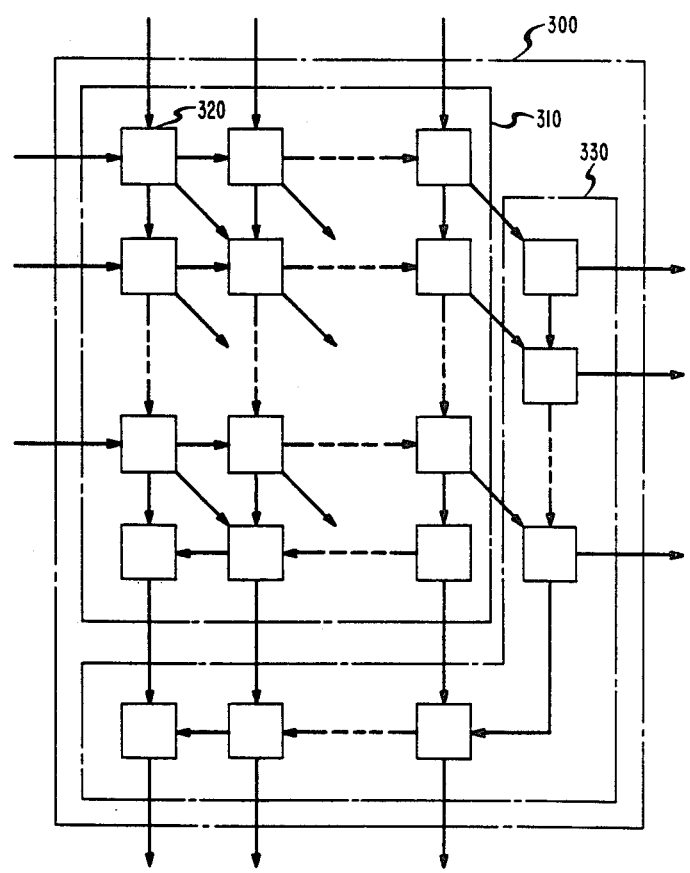
FIG. 2 illustrates one embodiment for rotator 300.

FIG. 2 illustrates a rotator structure in accordance with our invention and it includes a multiplication section 310 and an addition and a subtraction section 330. One important aspect of the FIG. 2 rotator is that all of the elements are constructed in an interleaved fashion, which means that corresponding functions of each of the four multipliers realized in section 310 are created as a unit and in close physical proximity to each other. This interleaving yields a number of advantages; one is that all signal leads (including the input leads) are short, which enhances the speed capabilities; a second is that all corresponding leads have essentially the same lengths, which minimizes skew and consequently enhances the speed capabilities; and a third is that the structure is completely regular, which permits efficient utilization of the silicon "real estate."

In FIG. 2, multiplication section 310 comprises a plurality of Quad Multiplier (QM) blocks 320. Each block 320 has two signal inputs and two coefficients inputs, as well as sum and carry inputs for handling information from another block 320. Blocks 320 are drawn to form a two dimensional rectangular matrix with elements 320 in each "row" and "column" being connected to two elements in a higher numbered "row": one in the same "column" and one in a higher numbered "column". That is, an element 320 at a "row" i and a "column" j ($(QM)_{i,j}$ is connected to $(QM)_{i+1,j}$ and to $(QM)_{i+1,j+1}$.

In accordance with the above, the structure of section 310 is basically rectangular and corresponds to a shifted version of the multiplication array as depicted below.

As seen from the above decomposition of the multiplication process, blocks 320 are not identical in all respects. They are identical in the sense that all are charged with contributing to the product by operating on three incoming bits (two bits in some degenerative positions) and developing sum and carry output bits. They differ in that some require AND gates while others require NAND gates, and also some require full adders while others require half adders, as described above. Also, although in some applications none of the QM elements are clocked or registered (i.e., no pipelining), in other applications some or all of the blocks are registered to provide whatever degree of pipelining is deemed desirable.

Figure 3:
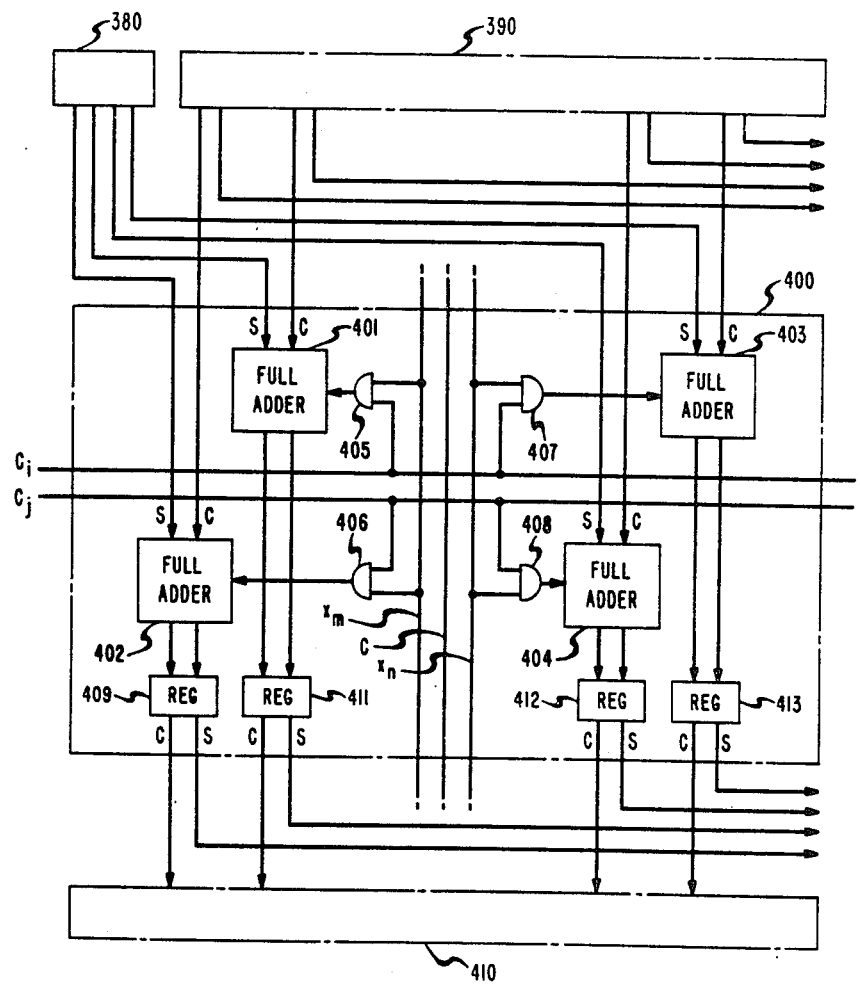
FIG. 3 depicts a block diagram of a typical element 320 in the FIG. 2 rotator.

FIG. 3 depicts a QM element comprising a full adder and a register. This is the general embodiment, since a QM element comprising a half adder and no register is, in essence, a stripped version of the QM element shown in FIG. 3. In FIG. 3, element 400 is a QM element 320 at a particular row end column within section 310. Element 390 is a QM element in a row above element 400 and in the same column, element 380 is a QM element in a row above element 400 and in a column that is of lower arithmetic significance (by one bit) than that of element 400, and element 410 is a QM element in a row below element 400.

Within element 400 there are full adders 401–404 that are responsive to multiplier bits $c_i$ and $c_j$, to like multiplicands bits (e.g., the third bit) of multiplicand words $x_m$ and $x_n$, to sum bits from QM element 380 and to carry bits from QM element 390. More particularly, adder 401 is responsive to a sum and a carry input from elements 380 and 390 and to a selected logical combination of $c_i$ and $x_m$; adder 402 is responsive to a sum and a carry input from elements 380 and 390 and to the same logical combination of $c_j$ and $x_m$; adder 403 is responsive to a sum and a carry input from elements 380 and 390 and to the same logical combination of $c_i$ and $x_n$, and, finally adder 410 is responsive to a sum and a carry input from elements 380 and 390 and to the same logical combination of $c_j$ and $x_n$. Each of the adders (410–404) develops a pair of signals comprising a sum output signal and a carry output signal. Each of these signal pairs are applied in the embodiment of FIG. 3 to a register which is also responsive to a clock signal, C. The clocked output signals of these registers (409–413) form the output signals of QM element 400. The carry signals are applied to QM element 410, while the sum signals are applied to the next most significant QM element in the row of element 410. The above-mentioned logical combinations of $c_i$ and $c_j$ with $x_m$ and $x_n$, performed by elements 405–408, are either AND gates or NAND gates, depending upon the particular row and column that element 390 occupies.

Section 330 in FIG. 2 comprises the adder and subtractor networks that are needed to complete the rotator function. Each QM element at the last (bottom) row and in the least significant (right most) column of array 320 delivers four sum bits and those bits must be added and subtracted appropriately. Each add/subtract element 340 within section 330, therefore, comprises a two bit adder and a two bit subtractor. In accordance with conventional design techniques, the subtractor is implemented by simply inverting the input that needs to be subtracted, and a "1" is added in the carry-in position of the first adder in the array. Described in other words, section 330 may simply comprises two ripple-through adders.

THE COMMUNICATION CIRCUIT

The communication circuit of FIG. 1 provides for the transferring of data to and from the rotator. This transferring is specific to the algorithm implemented, but the hardware realization described below is generic. It can be shown that an orthogonal transformation (matrix Q) can be implemented with a sequence of plane-rotations (matrix $T_{ij}$) in accordance with:

$$Q = \prod_{i=0}^{i=N-1} \prod_{j=i+1}^{j=N-1} T_{ij}(\theta) \tag{6}$$

where $T_{ij}(\theta) = \begin{bmatrix} 1\,0 & . & . & . & 0 \\ 0\,1 & . & . & . & . \\ . . & \cos\theta & . \sin\theta & . \\ . . & . & . & . \\ . . & -\sin\theta & . \cos\theta & . \\ 0. & . & . & . & 1 \end{bmatrix}$.

This principle is employed in our transform processor, as illustrated below in connection with a Discrete Cosine Transforms (DCT) embodiment.

An eight point *DCT* transform can be expressed by the matrix $$\begin{bmatrix} y_0 \\ y_1 \\ y_2 \\ y_3 \\ y_4 \\ y_5 \\ y_6 \\ y_7 \end{bmatrix} =$$

$$\begin{bmatrix} 354 & 354 & 354 & 354 & 354 & 354 & 354 & 354 \\ 490 & 416 & 278 & 098 & -098 & -278 & -416 & -490 \\ 462 & 191 & -191 & -462 & -462 & -191 & 191 & 462 \\ 416 & -098 & -490 & -278 & 278 & 490 & 098 & -416 \\ 354 & -354 & -352 & 354 & 354 & -354 & -354 & 354 \\ 278 & -490 & 098 & 416 & -416 & -098 & 490 & -278 \\ 191 & -462 & 462 & -191 & -191 & 462 & -462 & 191 \\ 098 & -278 & 416 & -490 & 490 & -416 & 278 & -098 \end{bmatrix}$$

$$\begin{bmatrix} x_0 \\ x_1 \\ x_2 \\ x_3 \\ x_4 \\ x_5 \\ x_6 \\ x_7 \end{bmatrix}$$

By rearranging columns and considering selected transformed output signals as signal pairs, the above can be decomposed and structured into four groupings, with each grouping comprising four terms of the form specified by Equation (1).

A hardware realization of such reformulation can be had with a rotator circuit as described above and with a communication circuit that has sufficient memory to store the input signals ($x_i$) and the developing intermediate results. A more efficient realization, however, is one that employs a "fast DCT" algorithm.

Figure 4:
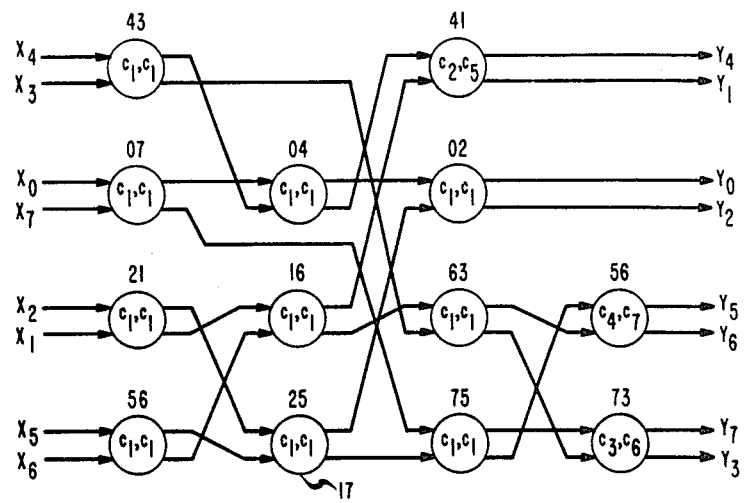
FIG. 4 describes the signal flow and the sequence of rotations necessary for implementing a discrete cosine transform with the FIG. 1 system.

FIG. 4 shows the signal flow for a "fast DCT" algorithm, where each of the circles in FIG. 4 (e.g., circle 17) represents an in-place rotation. By "in-place rotation" we mean that the rotation operation is performed with a communication circuit that, as it feeds two input signals to the rotator from particular storage locations, the results (from the rotator) are placed back into the same storage locations. What is necessary, then, is to appropriately control the sequencing of signals to and from communications circuit 100 to accomplish the end results which are specified in FIG. 4 and summarized in Table 1 below.

TABLE 1

$y_4 = c_2c_1{}^2(-x_0 - x_7 + x_4 + x_3) + c_5c_1{}^2(-x_2 + x_1 - x_5 + x_6)$
$y_1 = c_5c_1{}^2(x_0 + x_7 - x_4 - x_3) + c_2c_1{}^2(-x_2 + x_1 - x_5 + x_6)$
$y_0 = c_1{}^3(x_0 + x_7 + x_4 + x_3 + x_2 + x_1 + x_5 + x_6)$
$y_2 = c_1{}^3(-x_0 - x_7 - x_4 - x_3 + x_2 + x_{1x} + 5x + x_6)$
$y_5 = c_4(c_1{}^2(x_0 - x_7) + c_1{}^3(-x_2 - x_1 + x_5 + x_6)) + c_7(c_1{}^3(x_2 - x_1 - x_5 + x_6) + c_1{}^2(-x_4 + x_3))$
$y_6 = c_7(c_1{}^2(-x_0 + x_7) + c_1{}^3(x_2 + x_1 - x_5 - x_6)) + c_4(c_1{}^3(x_2 - x_1 - x_5 + x_6) + c_1{}^2(-x_4 + x_3))$
$y_7 = c_3(c_1{}^2(-x_0 + x_7) + c_1{}^3(-x_2 - x_1 + x_5 + x_6)) + c_6(c_1{}^3(-x_2 + x_1 + x_5 - x_6) + c_1{}^2(-x_4 + x_3))$
$y_3 = c_6(c_1{}^2(x_0 - x_7) + c_1{}^3(x_2 + x_1 - x_5 - x_6)) + c_3(c_1{}^3(-x_2 + x_1 + x_5 - x_6) + c_1{}^2(-x_4 + x_3))$

Figure 5:
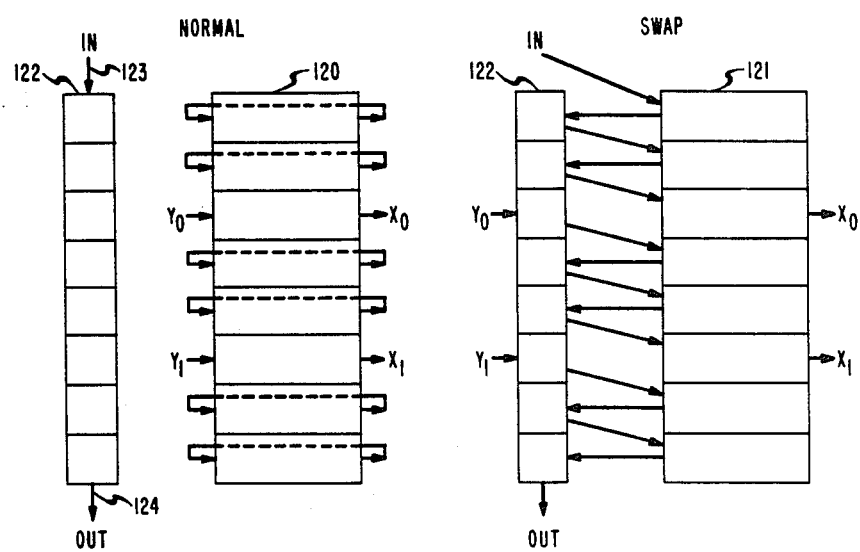
FIG. 5 describes the general structure of the memory in communication circuit 100 depicted in FIG. 1.

In addition to the task of supplying input signals and intermediate results to the rotator cirucit, communications circuit 100 depicting two modes of operation must also accept new data as it arrives. With these two functions in mind, FIG. 5 presents a functional diagram of a communications circuit 100 in consonance with the principles of our invention. In accordance with FIG. 5, circuit 100 comprises an addressable memory 121 and a nonaddressable memory 122. Memory 122 is primarily a serial memory. That is, input data is shifted into memory 122 at line 123, and transformed output signals are shifted out of memory 122 at line 124. This condition is depicted by the left side illustration of FIG. 5 under the heading "normal". While input data is being shifted into memory 122, memory 121 is engaged with rotator 300 and performs the in-place substitutions of rotator results for rotator input signals. This is easily achieved since memory 121 is addressable and arranged so that data from each storage address is fed back to itself at all addresses other than at the two selected ones. At the two selected addresses the aforementioned substitution occurs as shown by signals $X_0$, $X_1$, $Y_0$, $Y_1$ in FIG. 5. When the transform performed by rotator 300 is completed, the data collected in memory 122 must be placed in memory 121 in preparation for the next transform. Concurrently, the transform results stored in memory 121 must be removed. This is accomplished by swapping the contents of memory 121 with the contents of memory 122, as depicted by the right side illustration of FIG. 5 under the heading "swap".

Table 2 shows the addressing sequence for memory 122 and the coefficients applied to rotator 300. The addresses and coefficients of Table 2 correspond to FIG. 4 designations.

TABLE 2

| addresses | coefficients | |
|---|---|---|
| 5, 6 | 0.707 | 0.707 |
| 2, 1 | 0.707 | 0.707 |
| 0, 7 | 0.707 | 0.707 |
| 4, 3 | 0.707 | 0.707 |
| 2, 5 | 0.707 | 0.707 |
| 1, 6 | 0.707 | 0.707 |
| 0, 4 | 0.707 | 0.707 |
| 7, 5 | 0.707 | 0.707 |
| 6, 3 | 0.707 | 0.707 |
| 0, 2 | 0.707 | 0.707 |
| 4, 1 | 0.383 | 0.924 |
| 7, 3 | 0.195 | 0.981 |
| 5, 6 | 0.556 | 0.831 |

Figure 6:
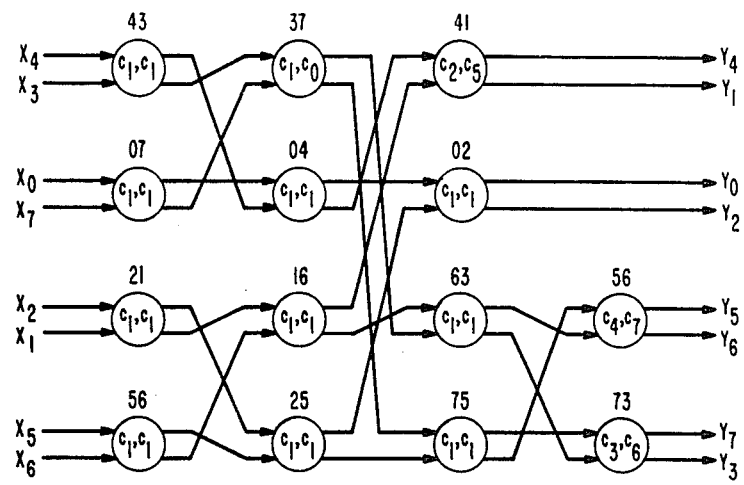
FIG. 6 describes another choice of signal flow and sequence of rotations for performing the discrete cosine transform with the FIG. 1 system.

The sequence of Table 2 is not the only sequence that is possible. FIG. 4 reveals that any sequence is acceptable which insures that certain rotations do not precede certain other rotations. It may also be noted that the fast DCT of FIG. 4 is not the only possible "fast DCT" algorithm. To illustrate, FIG. 6 presents an algorithm that, in some sense, is more regular than the algorithm depicted in FIG. 4. The circles and numbers in FIG. 6 have the same meaning as in FIG. 4.

Figure 7:
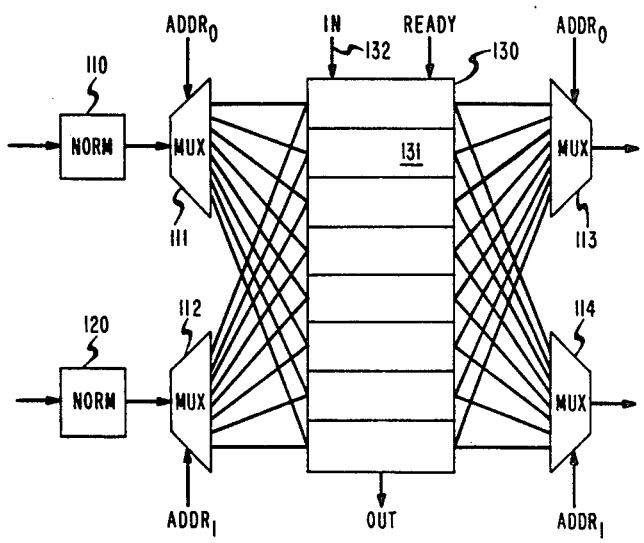
FIG. 7 describes a more comprehensive block diagram of the communications circuit depicted in FIG. 1.

FIG. 7 illustrates one communication circuit 100 embodiment for implementing the functional diagram of FIG. 5. Input signals $Y_0$ and $Y_1$ are applied to normalization units 110 and 120, and the outputs of normalization units 110 and 120 are applied to address multiplexers 111 and 112. Multiplexers 111 and 112 are responsive to address signals $addr_0$ and $addr_1$. These address signals are delivered to communication circuit 100 by Look-up table 200 and they follow the sequence defined, for example, in Table 2. Multiplexers 111 and 112 are conventional one-to-many selectors, in the sense that they cause input signals $Y_0$ and $Y_1$ to appear on one output of the many outputs of multiplexers 111 and 112, respectively. Multiplexers 111 and 112 differ from conventional multiplexers in that with each output lead there is an associated control lead which identifies the output lead upon which signals are present. This lead enables the feeding back of signals from all of the registers that do not receive signals Y, as discussed in connection with FIG. 5. The outputs of multiplexers 111 and 112 are connected to a multi input-multi output memory block 130 which encompasses memories 121 and 122, and which comprises a plurality of storage blocks 131. Each storage block 131 has two inputs and two outputs, a "ready" control signal input, an enable control signal, and two registers. The outputs of multiplexer 111 are each connected to one input of a different storage block 131. The outputs of multiplexer 112 are each connected in parallel to the outputs of multiplexer 111. The other input of each storage block is connected to the one output of the previous storage block 131, forming thereby the input and output connections to the serial memory arrangement 122. The other outputs of storage block 131 are applied to address multiplexers 113 and 114, which are under control of $addr_0$ and $addr_1$ control signals. The output signals of multiplexers 113 and 114 (many-to-one) are the signals $X_0$ and $X_1$ that are applied to rotator 300. Signals $X_0$ and $X_1$ are either the input signal x or intermediate results terms as described by the signal flow diagram of FIG. 4. As indicated above, signals $Y_0$ and $Y_1$ are the computation results of the rotator which, at completion, are equal to $y_0$ and $y_1$.

Figure 8:
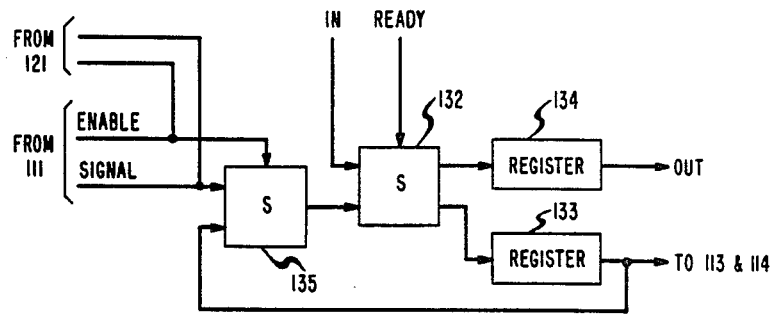
FIG. 8 depicts the manner by which information is communicated among the memory elements depicted in FIG. 5.

FIG. 8 depicts one realization for storage blocks 131. It includes registers 133 and 134, a double pole double throw switch 132, and a single pole double throw switch 135. The input signals from multiplexers 111 and 112 are applied to the input port of switch 135, and the enable signals from multiplexers 111 and 112 are applied to the control port of switch 135. The other input to switch 135 is obtained from the output of register 133, achieving thereby the signal feed-back capability. The output signal of switch 135 is applied to one input of switch 132, while the serial input of block 131 is applied to the other input of switch 132. Switch 132 is controlled by the "ready" control signal. Normally the "ready" control signal is set so that the serial input is applied by switch 132 to register 134 and the other input (from switch 135) is applied to register 133. The output of register 133 is applied to multiplexers 113 and 114 (in addition to being applied to switch 135), while the output signal of register 134 is applied to the serial input of the next block 131.

Figure 9:
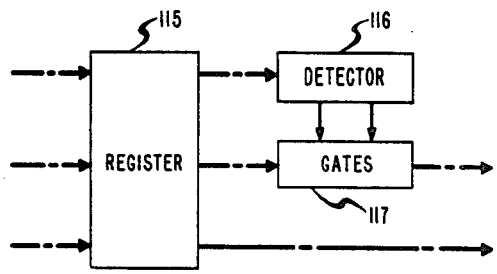
FIG. 9 presents one embodiment for realizing the normalizer blocks of FIG. 7.

Normalization units 110 and 120 in FIG. 7 are necessary because the multiplication results of rotator 300 contain a number of bits that is equal to sum of the bits in the multiplier and the multiplicand (plus 1). This number has to be reduced to the number of bits in the multiplicand if the results are not to grow with each iteration. This can be done with simple truncation, but we suggest a normalization unit that clips infrequently occurring large values. Such clipping permits us to truncate fewer bits and thereby achieve a lower level of truncation errors. FIG. 9 depicts a simple realization for normalization units 110 and 120. Register 115 accepts the results of rotator 300, and a selected high significance output bits of register 115 are applied to detector 116. When detector 116 sees all 0's or all 1's (the sign bit), a selected group of the next most significant bits of register 115 are passed through gate arrangement 117 to the multiplexers of FIG. 7. Otherwise, detector 117 blocks those output bits and replaces them with the sign bit.

THE LOOK-UP TABLE

The orthogonal transform architecture is an iterative approach that requires a sequence of coefficients and "addr" addresses control signals in rapid succession. A conventional read-only memory and a counter is one solution for this function, but it is difficult to improve the speed of the address decoding in a standard ROM, and counters are more complicated than necessary. A serially-addressed read-only memory satisfies the requirements of the transform architecture and has the advantages of a shift-register intensive design.

Figure 10:
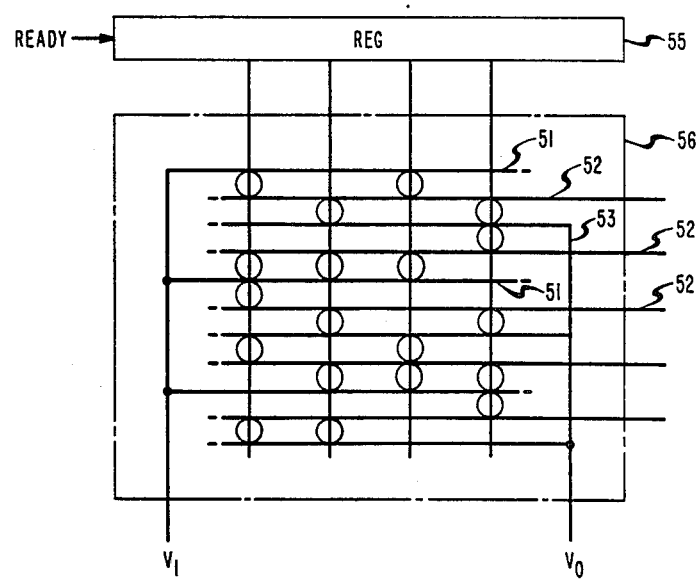
FIG. 10 illustrates the structure of a fast counterless look-up table.

Referring to FIG. 10, the read-only memory is embodied in block 56 which comprises a collection of signal lines, 51, 52, and 53 and activatable connection points 54. The signal lines are interleaved in accordance with the sequence 51, 52, 53, 52, 51, 52, ..., and connection points 54 connect (when activated) selected adjacent lines. Lines 51 are all connected to a first voltage source, $V_1$, corresponding to logic level "1", and lines 54 are all connected to a second voltage source, $V_0$, corresponding to logic level "0". Lines 52 form the output of the memory. Connection points 54 are conventional semiconductor switches under control of activation signals. The connection points are arranged in groups, with each group consisting of a connection point associated with each line 52, and with all of the connection points being controlled by a single control signal. Control signals for the various groups are obtained from register 55, into which a pulse is inserted with each "ready" signal applied to look-up table 200. Successive words of memory are accessed as the "ready" pulse is shifted through register 55.

Figure 11:
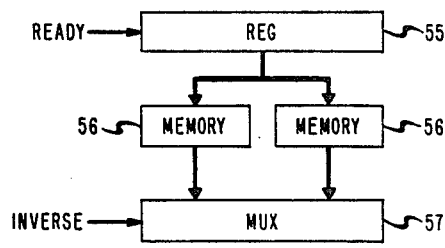
FIG. 11 describes an augmented structure for the look-up table of FIG. 1, containing two memory elements 56.

Look-up table 200 in FIG. 1 also depicts an "inverse" control signal applied to the table. This signal provides for developing the inverse transform. The inverse transform can be realized with a second look-up table built into element 200, as shown in FIG. 11. All that is required is to employ two block 56 controlled by a register 55 and a multiplexer 57 that selects (under control of the "inverse" control signal) one of the two block 56 memories. This second look-up table permits specification of a different sequence of address coefficients.

TWO-DIMENSIONAL TRANSFORMS

Figure 12:
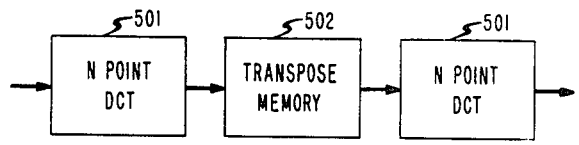
FIG. 12 presents one block diagram for implementing a two-dimensional orthogonal transform.

A candidate for the international low bit-rate video coder transform standard is a two-dimensional DCT on $8 \times 8$ blocks of pixels. This is separable into a one dimensional 8-point transform on each row of 8 pixels followed by a one dimensional 8-point transform on each column. Such a transform can be implemented, as shown in FIG. 12, with an orthogonal transform processor 501 cascaded with a transpose memory 502 and another orthogonal transform processor 501; or it can be implemented in a single orthogonal transform processor 501 where the memory contains 64 samples and the look-up table is arranged appropriately.

Figure 13:
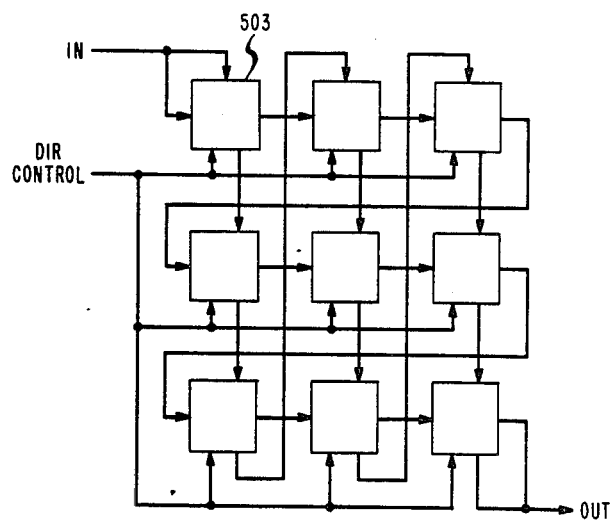
FIG. 13 depicts one embodiment for transpose memory 502 identified in FIG. 12.

FIG. 13 presents one approach to the realization of transpose memory 502. It comprises a two dimensional array of storage registers 503 that can be configured to shift in a horizontal or vertical raster-scan sequence. More particularly, each storage register 503 has a horizontal input and output, a vertical input and output, and a direction control input. The array of registers 503 is interconnected by having horizontal outputs within a row connected to horizontal inputs within the same row, and vertical outputs in a column connected to vertical inputs within the same column. This applies to all elements which are not in the first or last column or row. The vertical output in the last row of each column is connected to the vertical input of the first row in the next column and, similarly, the last horizontal output in each column is connected to the first horizontal input in the next row. The two inputs of the register in the first row and the first column are interconnected and comprise the input to transpose memory 502. The two outputs of the register in the last row and the last column are also interconnected and comprise the output of transpose memory 502.

Figure 14:
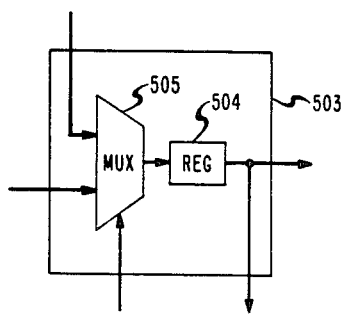
FIG. 14 illustrates a structure of memory cells 503 of the FIG. 13 transpose memory.

As shown in FIG. 14, each storage register 503 includes a register 504 and a selector 505. Selector 505 is responsive to the direction control signal which selects either the horizontal input or the vertical input. The selected input is applied to register 504, and the output of register 504 is applied to both the horizontal and the vertical outputs.

In operation, data is shifted in until the matrix is full. Then, the direction of shifting (dir control) is reversed and the data is shifted out while the next block of data is shifted in. The direction control signal is, thus a simple square wave. This structure has the advantage that it can operate at extremely high speed.

The disclosures made and the different embodiments described herein are, of course, merely illustrative of our invention. Many changes in construction, and widely differing embodiments and applications will, no doubt, suggest themselves to those skilled in the art, without departing from the spirit and scope of this invention. For example, the processor may contain more than one processing element, e.g., a rotator and a separate adder/subtractor unit which implements rotations of 45°, which will increase the processing speed of the unit by taking advantage of the parallelism in the algorithm. That is, while FIG. 1 depicts a communications circuit 100 which serves as an I/O interface and a storage means communicating with a processor element (rotator 300), by a simple extension of our invention one can employ a plurality of processor elements connected to the I/O interface and the storage means (considered as being embedded within rotator 300, or otherwise).

What is claimed is:

1. An orthogonal transform processor comprising:
    a rotator responsive to a first rotator input signal, $x_0$, a second rotator input signal, $x_1$, a first coefficient signal, $c_0$, and a second coefficient signal, $c_1$, for developing a first rotator output signal equal to $c_0 x_0 + c_1 x_1$ and a second rotator output signal equal to $-c_1 x_0 + c_0 x_1$;
    a communication circuit, responsive to applied processor input signals, for applying to said rotator said first and second rotator input signals, for accepting said first and said second rotator output signals, and for delivering transformed output signals of said orthogonal transform processor; and
    means, responsive to an initiation control signal, for providing control signals to said communication circuit, and said first and second coefficient signals to said rotator.

2. The processor of claim 1 wherein said means for providing control signals is also responsive to an "inverse" control signal for effecting in said processor a prechosen orthogonal transform processor when said "inverse" control signal is at a first logic level, and for effecting in said processor the inverse transform of said prechosen orthogonal transform when said "inverse" control signal is at a second logic level.

3. The transform processor of claim 1 wherein said first and second rotator input signals belong to a set of signals that includes said processor input signals and said first and second rotator output signals.

4. The transform processor of claim 1 wherein said rotator comprises four multipliers, each of which including a plurality of modules, with corresponding modules of said four multipliers being in close physical proximity to each other.

5. The transform processor of claim 1 wherein said rotator performs four multiplications and comprises an array of interconnected modules, with each module comprising four segments and each segment in a module performing a like portion of the multiplications performed in said rotator.

6. The transform processor of claim 1 wherein said rotator performs four multiplications and comprises a matrix of spatially adjacent and interconnected multiplier-adder modules, with each module comprising four segments and each segment in a module performing a like portion of the multiplications performed in said rotator.

7. The transform processor of claim 1 wherein said rotator performs four multiplications and comprises an matrix of spatially adjacent and interconnected multiplier and adder modules, with each module comprising:
   a first multiplication logic element responsive to $x_0$ and $c_0$;
   a first adder responsive to applied sum and carry signals and to said first multiplication logic element, for developing an output sum signal and an output carry signal;
   a second multiplication logic element responsive to $x_0$ and $c_1$;
   a second adder responsive to applied sum and carry signals and to said second multiplication logic element, for developing an output sum signal and an output carry signal:
   a third multiplication logic element responsive to $x_1$ and $c_0$;
   a third adder responsive to applied sum and carry signals and to said third multiplication logic element, for developing an output sum signal and an output carry signal;
   a fourth multiplication logic element responsive to $x_1$ and $c_1$; and
   a fourth adder responsive to applied sum and carry signals and to said fourth multiplication logic element, for developing an output sum signal and an output carry signal.

8. The module of claim 7 further comprising register means responsive to said output sum and output carry signals of said first, second, third, and fourth adders and to an applied clock signal, for developing clocked sum and carry output signals of said module.

9. The module of claim 7 wherein said multiplication logic elements are AND gates.

10. The transform processor of claim 1 wherein said means for providing control signals comprises:
    a shift register responsive to said initiation control signal for developing delayed replicas of said initiation control signal; and
    a plurality of connection point groups, with each group being controlled by a different one of said delayed replicas of said initiation control signal.

11. The processor of claim 1 wherein said communications circuit comprises:
    first and second memory segments wherein
    said first memory segment stores said applied processor input signals and provides said stored processor input signals to said second memory segment under control of said initiation control signal; and
    said second memory segment, responsive to control signals from said means for developing control signals, stores signals provided by said first memory segment, applies signals to said rotator, stores said output signals of said rotator and, under control of said initiation control signal, applies said transformed output signals to said first memory segment.

12. The transform processor of claim 1 wherein said rotator comprises four multipliers, each of which including a plurality of modules, with corresponding modules of said four multipliers being in close physical proximity to each other; and adder/subtractor network responsive to some of said modules.

13. A two-dimensional m point by n point orthogonal transform processor comprising:
    a first orthogonal transform processor responsive to applied input signals for developing m point transforms;
    a second orthogonal transform processor responsive to intermediate input signals for developing n point transforms; and
    a transpose memory responsive to said m point transforms of said first orthogonal transform processor for storing n of said m point transforms of said first orthogonal transform processor and for reading out said n stored m point transforms in a transposed order to develop said intermediate input signals;
    wherein each of said first and second second orthogonal transform processors comprises a rotator responsive to a first rotator input signal, $x_0$, a second rotator input signal, $x_1$, a first coefficient signal, $c_0$, and a second coefficient signal, $c_1$, for developing a first rotator output signal equal to $c_0 x_0 + c_1 x_1$ and a second rotator output signal equal to $-c_1 x_0 + c_0 x_1$;
    a communication circuit, responsive to applied orthogonal transform processor input signals, for applying to said rotator said first and second rotator input signals, for accepting said first and said second rotator output signals, and for delivering transformed output signals of said orthogonal transform processor; said output signals being the input signals to said transpose memory, in the case of said first orthogonal transform processor, and forming output signals of said two-dimensional orthogonal transform processor, in the case of said second orthogonal transform processor; and
    means, responsive to an initiation control signal, for providing control signals to said communication circuit, and said first and second coefficient signals to said rotator.

14. An orthogonal transform processor comprising:
    a communications circuit responsive to applied processor signals and to pairs of intermediate signals for developing signal pairs to be rotated;
    control means responsive to initiation control signals for supplying control signals to said communications circuit and coefficient signals; and
    at least one processor element responsive to said coefficient signals and to said signal pairs to be rotated developed by said communications circuit, for developing said intermediate signals by effecting a phasor rotation of said signal pairs to be rotated in accordance with said coefficient signals.

15. An orthogonal transform processor comprising:
    a communications circuit responsive to applied processor signals and to pairs of intermediate signals, $y_0$ and $y_1$ for developing signal pairs $x_0$ and $x_1$ to be rotated;
    control means responsive to initiation control signals for supplying control signals to said communications circuit and coefficient signals $c_0$ and $c_1$; and
    at least one processor element responsive to said coefficient signals and to said signal pairs to be rotated developed by said communications circuit, for developing said intermediate signals by effecting a phasor rotation of said signal pairs to be rotated in accordance with:

$y_0 = c_0 x_0 + c_1 x_1$ $y_1 = -c_1 x_0 + c_0 x_1$.

* * * * *